(12) United States Patent
Imai et al.

(10) Patent No.: US 11,422,657 B2
(45) Date of Patent: Aug. 23, 2022

(54) REMOTE CONTROL DEVICE, PROCESSING DEVICE, AND NON-TRANSITORY COMPUTER-READABLE MEDIUM HAVING RECORDED COMPUTER PROGRAM FOR THE PROCESSING DEVICE TO REMOTELY CONTROL AN OPERATION OF A CONTROLLED DEVICE

(71) Applicant: KABUSHIKI KAISHA TOKAI RIKA DENKI SEISAKUSHO, Aichi (JP)

(72) Inventors: Takao Imai, Aichi (JP); Itaru Watanabe, Aichi (JP); Shoji Kakinuma, Aichi-ken (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/151,943

(22) Filed: Jan. 19, 2021

(65) Prior Publication Data

US 2021/0223930 A1 Jul. 22, 2021

(30) Foreign Application Priority Data

Jan. 21, 2020 (JP) .............................. JP2020-007462

(51) Int. Cl.
*G06F 3/041* (2006.01)
*G06F 3/044* (2006.01)
*G06F 3/04886* (2022.01)

(52) U.S. Cl.
CPC .......... *G06F 3/04162* (2019.05); *G06F 3/044* (2013.01); *G06F 3/04886* (2013.01);

(Continued)

(58) Field of Classification Search
CPC . G06F 2203/04101; G06F 2203/04104; G06F 3/04162; G06F 3/044; G06F 3/04886
See application file for complete search history.

(56) References Cited

U.S. PATENT DOCUMENTS

2007/0182721 A1* 8/2007 Watanabe ............ H04N 13/361
345/173
2011/0267371 A1* 11/2011 Song ................... G06F 3/04886
345/660
2015/0160760 A1* 6/2015 Sato .......................... G06F 1/16
345/174

FOREIGN PATENT DOCUMENTS

JP 2016-115121 6/2016

* cited by examiner

*Primary Examiner* — Lisa S Landis
(74) *Attorney, Agent, or Firm* — Greenblum & Bernstein, P.L.C.

(57) ABSTRACT

A control surface has a first area configured to accept a first operation performed with an object for enabling a first function of the controlled device, a second area configured to accept a second operation performed with the object for enabling a second function of the controlled device, and a third area located between the first and second areas. A processing device is configured to: enable the third area to accept the first operation in a case where it is determined that an object contacts or approaches the first area; enable the third area to accept the second operation in a case where it is determined that the object contacts or approaches the second area; and disable acceptance of the first operation and the second operation in a case where it is determined that the objects contacts or approaches the third area prior to the first and second areas.

6 Claims, 8 Drawing Sheets

(52) U.S. Cl.
CPC .............. *G06F 2203/04101* (2013.01); *G06F 2203/04104* (2013.01)

REMOTE CONTROL DEVICE, PROCESSING DEVICE, AND NON-TRANSITORY COMPUTER-READABLE MEDIUM HAVING RECORDED COMPUTER PROGRAM FOR THE PROCESSING DEVICE TO REMOTELY CONTROL AN OPERATION OF A CONTROLLED DEVICE

FIELD

The presently disclosed subject matter relates to a remote control device adapted to be installed in a mobile entity to remotely control the operation of a controlled device. The presently disclosed subject matter also relates to a processing device installed in the remote control device, and a non-transitory computer-readable medium having recorded a computer program adapted to be executed by the processing device.

BACKGROUND

Japanese Patent Publication No. 2016-115121A discloses a remote control device adapted to be installed in a vehicle, which is an example of the mobile entity. The device includes a control surface configured to accept an operation performed with a finger of an occupant. In accordance with the operation performed on the control surface, the operation of the display device, which is an example of the controlled device, is controlled.

SUMMARY

It is demanded to improve the operability of a remote control device adapted to be installed in a mobile entity.

In order to meet the demand described above, one illustrative aspect of the presently disclosed subject matter provides a remote control device adapted to be installed in a mobile entity to control an operation of a controlled device, comprising:
  a control surface having a first area configured to accept a first operation performed with an object for enabling a first function of the controlled device, a second area configured to accept a second operation performed with the object for enabling a second function of the controlled device, and a third area located between the first area and the second area;
  a detector configured to detect an electrostatic capacity between the control surface and the object; and
  a processing device configured to:
    determine that the object contacts or approaches the first area, the second area or the third area, based on the electrostatic capacity;
    enable the third area to accept the first operation in a case where it is determined that the object contacts or approaches the first area;
    enable the third area to accept the second operation in a case where it is determined that the object contacts or approaches the second area; and
    disable acceptance of the first operation and the second operation in a case where it is determined that the objects contacts or approaches the third area prior to the first area and the second area.

In order to meet the demand described above, one illustrative aspect of the presently disclosed subject matter provides a processing device adapted to be installed in a remote control device configured to remotely control an operation of a controlled device in a mobile entity, comprising:
  a reception interface configured to receive a detection signal corresponding to an electrostatic capacity between an object and a control surface having a first area configured to accept a first operation performed with the object for enabling a first function of the controlled device, a second area configured to accept a second operation performed with the object for enabling a second function of the controlled device, and a third area located between the first area and the second area; and
  a processor configured to:
    determine that the object contacts or approaches the first area, the second area or the third area, based on the electrostatic capacity;
    enable the third area to accept the first operation in a case where it is determined that the object contacts or approaches the first area;
    enable the third area to accept the second operation in a case where it is determined that the object contacts or approaches the second area; and
    disable acceptance of the first operation and the second operation in a case where it is determined that the objects contacts or approaches the third area prior to the first area and the second area.

In order to meet the demand described above, one illustrative aspect of the presently disclosed subject matter provides a non-transitory computer-readable medium having recorded a computer program adapted to be executed by a processor in a processing device adapted to be installed in a remote control device configured to remotely control an operation of a controlled device in a mobile entity, the computer program being configured to, when executed, cause the processing device to:
  receive a detection signal corresponding to an electrostatic capacity between an object and a control surface having a first area configured to accept a first operation performed with the object for enabling a first function of the controlled device, a second area configured to accept a second operation performed with the object for enabling a second function of the controlled device, and a third area located between the first area and the second area;
  determine that the object contacts or approaches the first area, the second area or the third area, based on the electrostatic capacity;
  enable the third area to accept the first operation in a case where it is determined that the object contacts or approaches the first area;
  enable the third area to accept the second operation in a case where it is determined that the object contacts or approaches the second area; and
  disable acceptance of the first operation and the second operation in a case where it is determined that the objects contacts or approaches the third area prior to the first area and the second area.

Since the remote control device is installed in the mobile entity, an occupant of the mobile entity may perform an operation with respect to the control surface without visual inspection. According to the configuration of each of the above illustrative aspects, when the approach or contact of the object to either the first area for accepting the first operation or the second area for accepting the second operation is detected, the third area located between the two areas changes to the area for accepting the first operation or the second operation, so that the stringency relating to the position in the control surface where an operation is accepted can be alleviated. Accordingly, it is possible to improve the operability of the remote control device adapted to be installed in the mobile entity.

DESCRIPTION OF EMBODIMENTS

Figure 1:
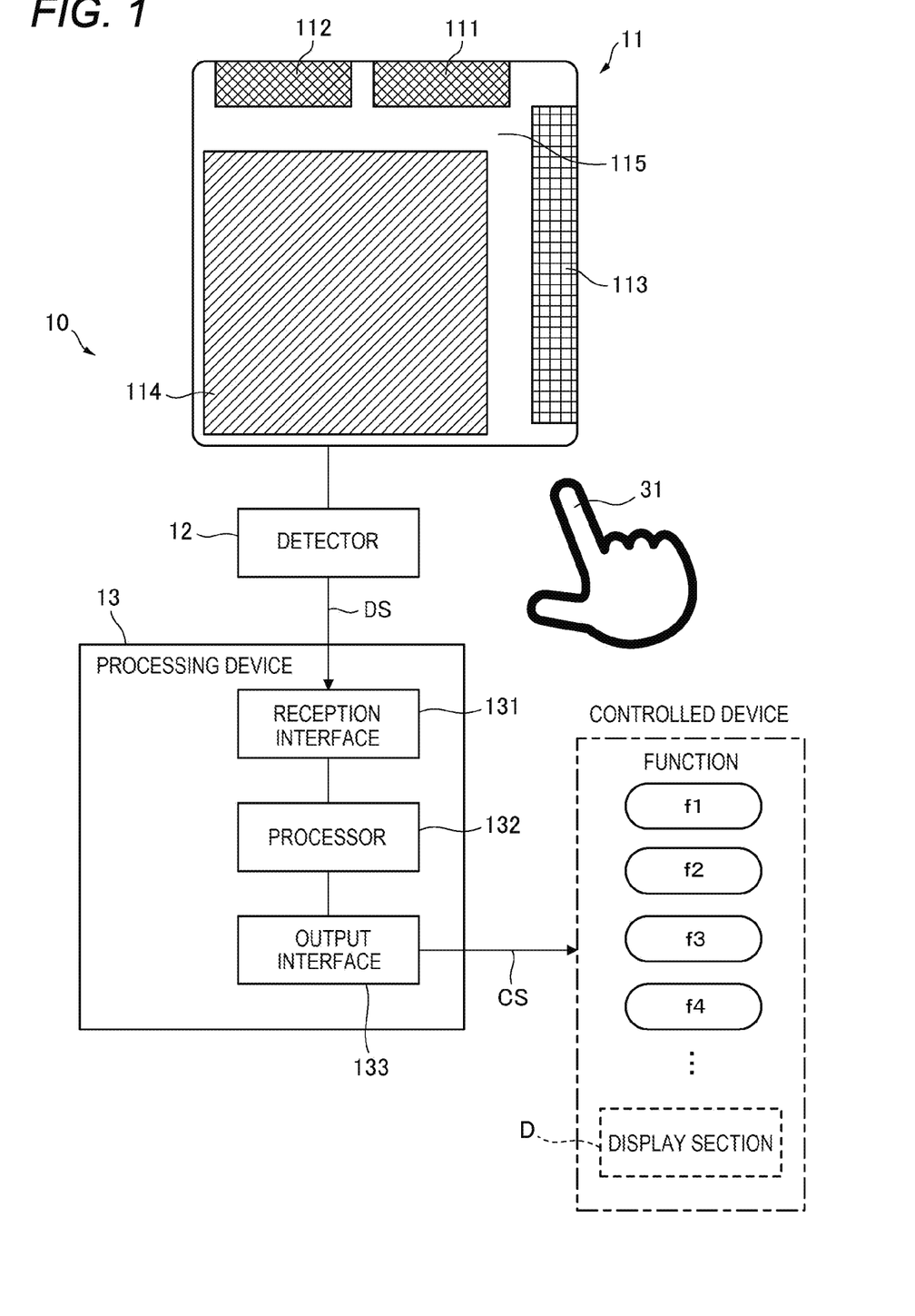
FIG. 1 illustrates a functional configuration of a remote control device according to an embodiment.

Embodiments will be described in detail below with reference to the accompanying drawings. FIG. 1 illustrates a functional configuration of a remote control device 10 according to an embodiment.

Figure 2:
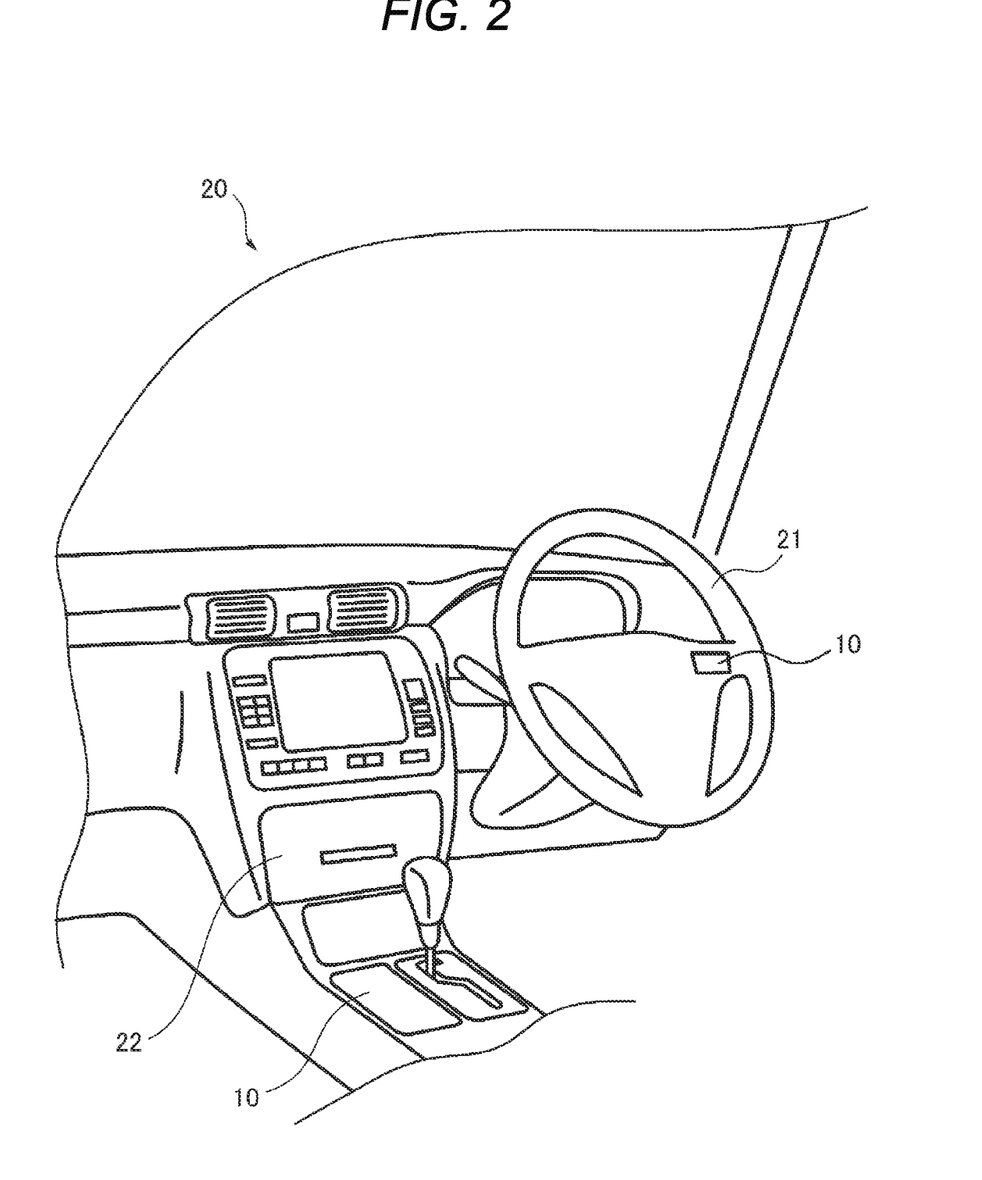
FIG. 2 illustrates a vehicle in which the remote control device of FIG. 1 is to be installed.

As illustrated in FIG. 2, the remote control device 10 is configured to be installed in a vehicle 20. For example, the remote control device 10 may be disposed on a steering wheel 21 or a center cluster 22 in a vehicle cabin of the vehicle 20. The remote control device 10 is configured to accept an operation performed by an occupant of the vehicle 20, and to remotely operate a controlled device installed in the vehicle 20 based on the operation. Examples of the controlled device include an air conditioner, a lighting device, an audio-visual equipment, a power windows driving device, and a seat control device. The vehicle 20 is an example of the mobile entity.

As illustrated in FIG. 1, the remote control device 10 includes a control surface 11. The control surface 11 is configured to accept an operation performed with a finger 31 of an occupant of the vehicle 20. The finger 31 of the occupant is an example of the object.

The control surface 11 includes a first switch area 111, a second switch area 112, a third switch area 113, a pad area 114, and an intermediate area 115. The control surface 11 is formed as a continuous surface. These areas are not structurally defined by the formation of grooves or steps on the surface, but at least one of a differently-colored portion, a mark, and an unevenness each of which has a small influence on the operation is appropriately provided on the surface, thereby causing the occupant to recognize the position of each area.

The first switch area 111 is an area capable of accepting an operation performed with the finger 31 for enabling a specific function f1 of the controlled device. Examples of the operation for enabling the function f1 include a plurality of tapping operations and a long-press operation.

As used herein, the term "tapping operation" means an operation in which the finger 31 touches the control surface 11 for a relatively short time length. In other words, it means an operation in which a contact time length between the control surface 11 and the finger 31 is less than a first threshold time length.

As used herein, the term "long-press operation" means an operation in which a state that the finger 31 touches the control surface 11 is maintained. In other words, it means an operation in which the contact time between the control surface 11 and the finger 31 exceeds a second threshold time length. The first threshold time length and the second threshold time length may be the same or different from each other.

The second switch area 112 is an area capable of accepting an operation performed with the finger 31 for enabling a specific function f2 of the controlled device. The function f2 may be a function of a controlled device different from the controlled device related to the function f1, or may be another function of the controlled device related to the function f1. Examples of the operation for enabling the function f2 include a plurality of tapping operations and a long-press operation.

The third switch area 113 is an area capable of accepting an operation performed with the finger 31 for enabling a specific function f3 of the controlled device. The function f3 may be a function of a controlled device different from the function f1 or the controlled device related to the function f2, or may be another function in the controlled device related to the function f1 or the function f2. Examples of the operation for enabling the function f3 include a swipe operation and a flick operation.

As used herein, the term "swipe operation" means an operation in which the finger 31 is moved while touching the control surface 11. In other words, it means an operation in which the contact position of the finger 31 on the control surface 11 changes at a speed less than a first threshold speed.

As used herein, the term "flick operation" means an operation in which the control surface 11 is flicked with the finger 31. In other words, it means an operation in which the contact position of the finger 31 on the control surface 11 changes at a speed exceeding a second threshold speed. The first threshold speed and the second threshold speed may be the same or different from each other.

Each of the first switch area 111, the second switch area 112, and the third switch area 113 is an example of the first area. Each of the operation for enabling the function f1, the operation for enabling the function f2, and the operation for enabling the function f3 is an example of the first operation for enabling the first function. In the following descriptions, the operation with respect to any of the first switch area 111, the second switch area 112, and the third switch area 113 will be referred to as a "switch operation" as required.

The pad area 114 is an area capable of accepting an operation performed with the finger 31 for enabling at least a function f4 in the controlled device. The function f4 may be a function of a controlled device different from the controlled device related to the function f1, the function f2, or the function f3, or may be another function in the controlled device related to the function f1, the function f2, or the function f3.

Examples of the operation for enabling at least the function f4 include a tapping operation, a long-press operation, a swipe operation, a flick operation, a pinch-in operation, a pinch-out operation, and the like. In particular, in a case where the controlled device is equipped with a display section D for displaying an image as illustrated in FIG. 1, the operation accepted by the pad area 114 may be an operation for associating a position in the control surface 11 with a position in the image.

As used herein, the term "pinch-in operation" means an operation of touching the control surface 11 with two fingers and decreasing the distance between the fingers. As used herein, the term "pinch-out operation" means an operation of touching the control surface 11 with two fingers and increasing the distance between the fingers.

The pad area 114 is an example of the second area. The operation for enabling at least the function f4 is an example of the second operation for enabling the second function. In the following descriptions, the operation with respect to the pad area 114 will be referred to as a "pad operation" as required.

The intermediate area 115 has a portion located between each of the first switch area 111, the second switch area 112, and the third switch area 113 and the pad area 114. The intermediate area 115 is an example of the third area.

The remote control device 10 includes a detector 12. The detector 12 is configured to detect an electrostatic capacitance between the control surface 11 and the finger 31.

Specifically, the detector 12 includes a plurality of electrodes and a charging/discharging circuit. The electrodes are disposed so as to face the control surface 11. Each of the electrodes is associated with a specific position in the control surface 11. The charging/discharging circuit can perform a charging operation and a discharging operation. The charging/discharging circuit supplies current supplied from a power source (not illustrated) to each electrode during the charging operation. The charging/discharging circuit causes each electrode to emit current during the discharging operation. An electric field is generated around the control surface 11 by the current supplied to each electrode. As the finger 31 approaches this electric field, a pseudo capacitor is formed between a particular electrode and the finger 31. As a result, the electrostatic capacitance between the specific electrode and the control surface 11 is increased. As the electrostatic capacitance increases, the current emitted from the particular electrode during the discharging operation increases.

That is, the detector 12 can detect a position in the control surface 11 where the finger 31 approaches or contacts by detecting the electrostatic capacitance between the control surface 11 and the finger 31. The detector 12 is configured to output a detection signal DS indicating the position in the control surface 11 where the finger 31 approaches or contacts. The detection signal DS may be an analog signal or a digital signal.

The remote control device 10 includes a processing device 13. The processing device 13 includes a reception interface 131, a processor 132, and an output interface 133.

The reception interface 131 is configured as an interface for receiving the detection signal DS outputted from the detector 12. In a case where the detection signal DS is an analog signal, the reception interface 131 may be equipped with an appropriate conversion circuit including an A/D converter.

As described above, the detection signal DS may indicate the position in the control surface 11 where the finger 31 approaches or contacts. The processor 132 is configured to determine that the finger 31 contacts or approaches the first switch area 111, the second switch area 112, the third switch area 113, the pad area 114, or the intermediate area 115 on the control surface 11 based on the detection signal DS.

The output interface 133 is configured as an interface for outputting a control signal CS for controlling the operation of the controlled unit. The processor 132 is configured to output a control signal CS from the output interface 133 based on the position in the control surface 11 at which the contact or approach of the finger 31 is detected. The control signal CS may be an analog signal or a digital signal. In a case where the control signal CS is an analog signal, the output interface 133 may be equipped with an appropriate conversion circuit including a D/A converter.

For example, when it is detected that the finger 31 contacts the first switch area 111 based on the detection signal DS, the processor 132 outputs a control signal CS for enabling the function f1 of the controlled device from the output interface 133.

Figure 3:
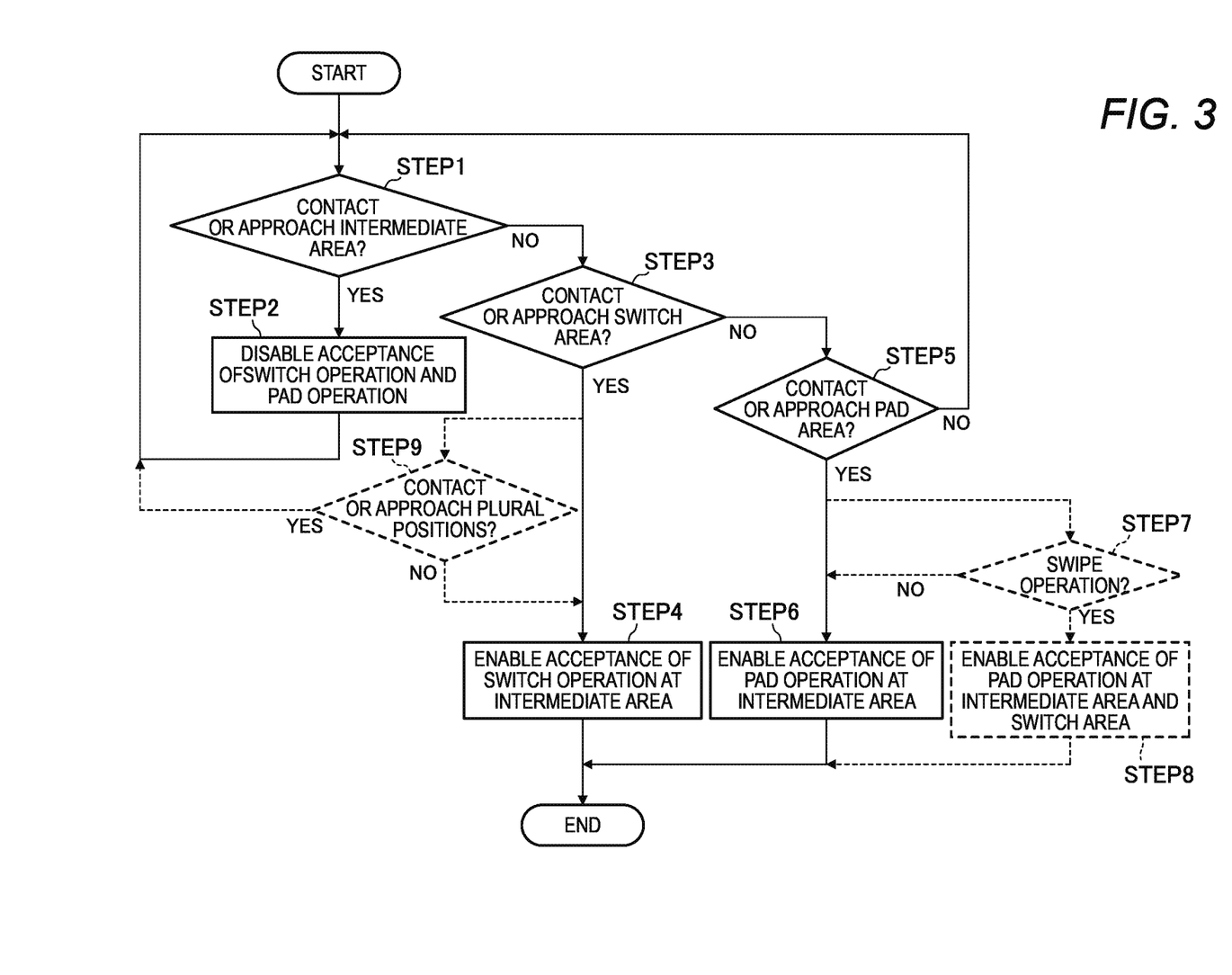
FIG. 3 illustrates a flow of processing executed by a processing device of FIG. 1.

Referring to FIG. 3, a more specific flow of processing executed by the processor 132 of the processing device 13 will be described.

Based on the detection signal DS, the processor 132 determines whether the finger 31 contacts or approaches the intermediate area 115 (STEP1).

When it is determined that the finger 31 contacts or approaches the intermediate area 115 (YES in STEP1), the processor 132 disables the control surface 11 to accept both the switch operation and the pad operation (STEP2). Thereafter, the processing returns to STEP1.

When it is determined that the finger 31 does not contact or approach the intermediate area 115 based on the detection signal DS (NO in STEP1), the processor 132 determines whether the finger 31 contacts or approaches any of the first switch area 111, the second switch area 112, and the third switch area 113 (STEP3).

When it is determined that the finger 31 contacts or approaches any of the first switch area 111, the second switch area 112, and the third switch area 113 (YES in STEP3), the processor 132 enables the intermediate area 115 to accept the switch operation (STEP4).

The processor 132 outputs a control signal CS for enabling the function of the controlled device associated with any of the first switch area 111, the second switch area 112, and the third switch area 113 from the output interface 133, and terminates the processing.

Figure 4:
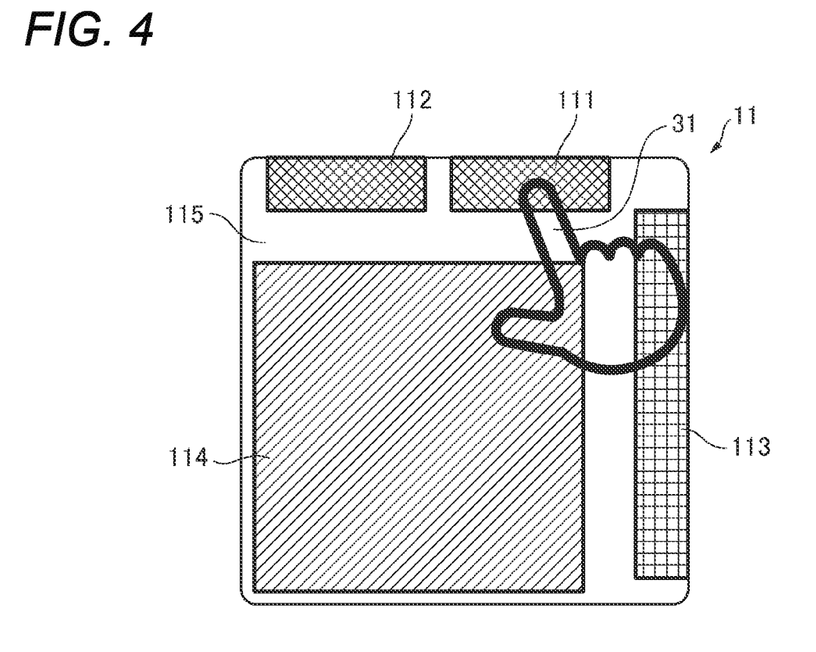
FIG. 4 illustrates a first exemplary operation executed by the processing device of FIG. 1.
Figure 5:
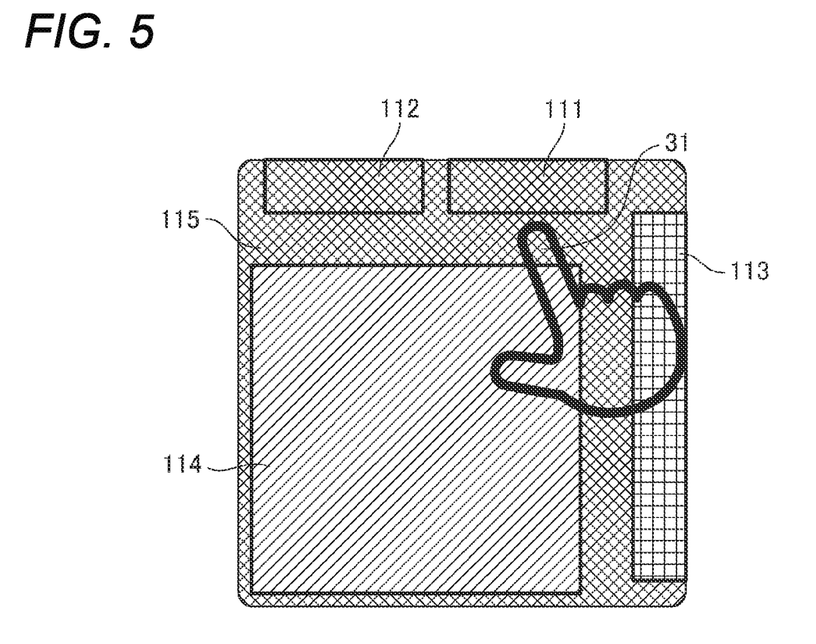
FIG. 5 illustrates the first exemplary operation executed by the processing device of FIG. 1.

For example, when the finger 31 approaches or contacts the first switch area 111 as illustrated in FIG. 4, the intermediate area 115 is changed to an area capable of accepting an operation with respect to the first switch area 111 as illustrated in FIG. 5. In other words, an area capable of accepting an operation with respect to the first switch area 111 is enlarged. Accordingly, even if the finger 31 is not located in the initial first switch area 111, the function f1 of the controlled device associated with the first switch area 111 can be enabled as long as the finger 31 is located in the intermediate area 115.

Figure 6:
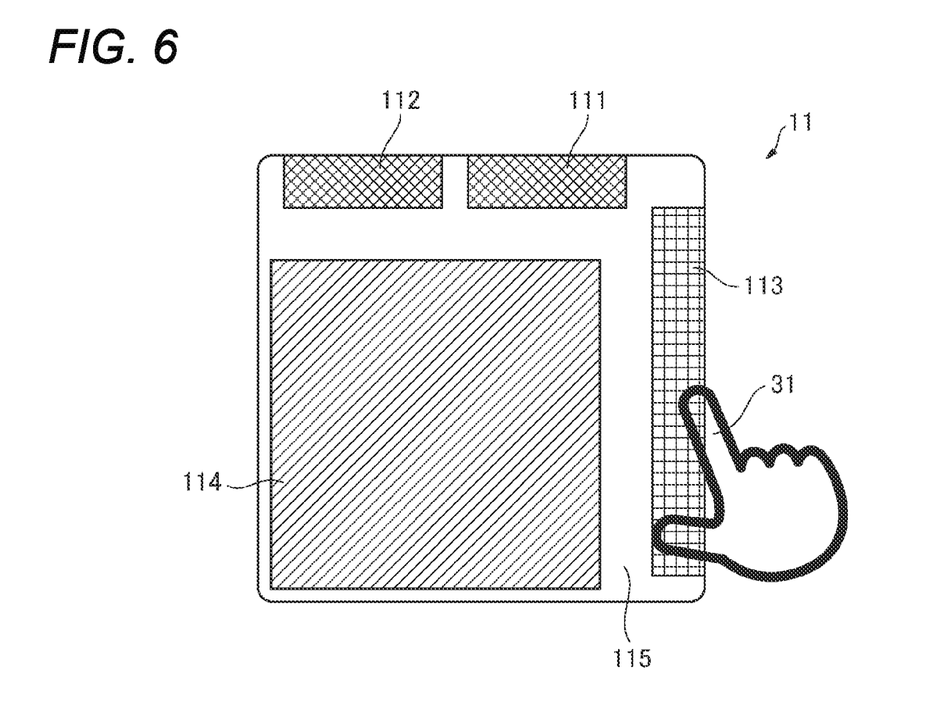
FIG. 6 illustrates a second exemplary operation executed by the processing device of FIG. 1.
Figure 7:
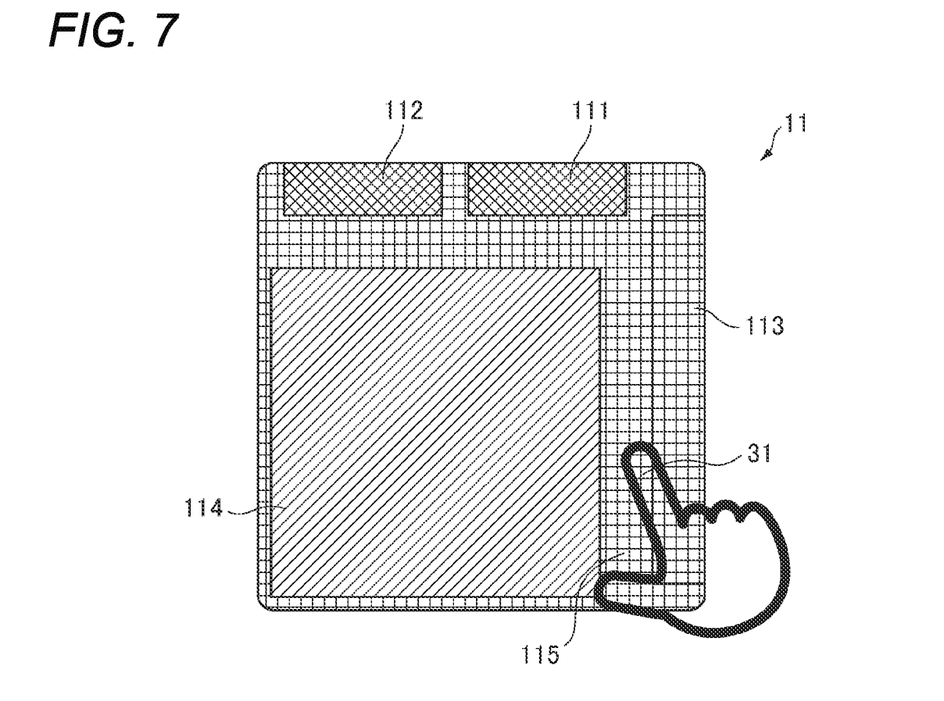
FIG. 7 illustrates the second exemplary operation executed by the processing device of FIG. 1.

Alternatively, as illustrated in FIG. 6, when the finger 31 approaches or contacts the third switch area 113, the intermediate area 115 is changed to an area capable of accepting an operation with respect to the third switch area 113, as illustrated in FIG. 7. In other words, an area capable of accepting an operation with respect to the third switch area 113 is enlarged. Accordingly, even if the finger 31 is not located in the initial third switch area 113, the function f3 of the controlled device associated with the third switch area 113 can be enabled as long as the finger 31 is located in the intermediate area 115.

When it is determined that the finger 31 does not contact or approach any of the first switch area 111, the second switch area 112, and the third switch area 113 based on the detection signal DS (NO in STEP3 in FIG. 3), the processor 132 determines whether the finger 31 contacts or approaches the pad area 114 (STEP5).

When it is determined that the finger 31 contacts or approaches the pad area 114 (YES in STEP5), the processor 132 enables the intermediate area 115 to accept the pad operation (STEP6).

The processor 132 outputs a control signal CS for enabling the function of the controlled device associated with the pad area 114 from the output interface 133, and terminates the processing.

Figure 8:
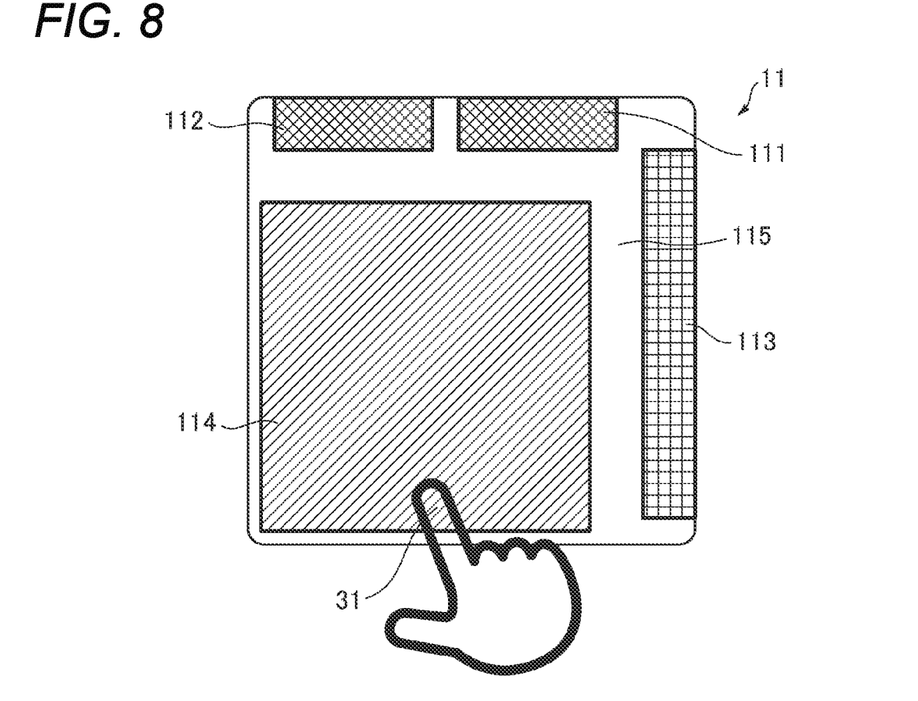
FIG. 8 illustrates a third exemplary operation executed by the processing device of FIG. 1.
Figure 9:
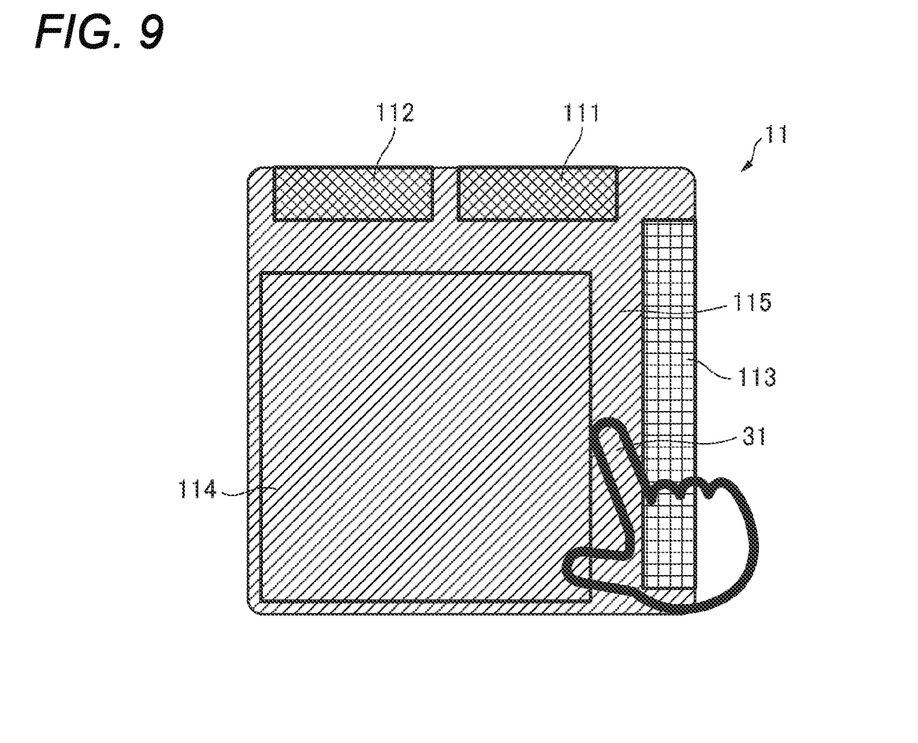
FIG. 9 illustrates the third exemplary operation executed by the processing device of FIG. 1.

For example, when the finger 31 approaches or contacts the pad area 114 as illustrated in FIG. 8, the intermediate area 115 is changed to an area capable of accepting an operation with respect to the pad area 114, as illustrated in FIG. 9. In other words, an area capable of accepting an operation with respect to the pad area 114 is enlarged. Accordingly, even if the finger 31 is not located in the initial pad area 114, the function f4 of the controlled device associated with the pad area 114 can be enabled as long as the finger 31 is located in the intermediate area 115.

The processor 132 outputs a control signal CS for enabling the function of the controlled device associated with the pad area 114 from the output interface 133, and terminates the processing.

When it is determined that the finger 31 does not contact or approach the pad area 114 based on the detection signal DS (NO in STEP5 in FIG. 3), the processor 132 determines that no effective operation is performed on the control surface 11, and returns the processing to STEP1.

That is, when it is determined that the finger 31 contacts or approaches the intermediate area 115 prior to any of the first switch area 111, the second switch area 112, the third switch area 113, and the pad area 114, the processor 132 disables the intermediate area 115 to accept both the switching operation and the pad operation.

Since the remote control device 10 is installed in the vehicle 20, an occupant during the driving may operate the control surface 11 with the finger 31 without visual inspection. Accordingly, a situation may occur in which the finger 31 deviates from a desired area during an operation with respect to the first switch area 111, the second switch area 112, the third switch area 113, or the pad area 114. Although a measure for physically dividing an area for accepting a switch operation and an area for accepting a pad operation may be considered, it is inevitable to increase the size and complexity of the structure of the remote control device 10.

According to the above configuration, when the approach or contact of the finger 31 to either the area for accepting the switch operation or the area for accepting the pad operation is detected, the intermediate area 115 located between the two areas changes to the area for accepting the switch operation or the pad operation, so that the stringency relating to the position in the control surface 11 where an operation is accepted can be alleviated. Accordingly, it is possible to improve the operability of the remote control device 10 adapted to be installed in the vehicle 20. In addition, since a plurality of areas associated with the functions of one or more controlled devices can be integrated into a common control surface 11 having a continuous surface, it is easy to suppress an increase in size and complexity of the structure of the remote control device 10.

It should be noted that it is possible to reverse the order in which the determination as to whether the finger 31 approaches or contacts any of the first switch area 111, the second switch area 112, and the third switch area 113 (STEP3) and the determination as to whether the finger 31 approaches or contacts the pad area 114 (STEP5) are performed.

As illustrated in FIG. 3, when it is determined that the finger 31 approaches or contacts the pad area 114 (YES in STEP5), the processor 132 may determine whether the swipe operation is initiated based on the detecting signal DS (STEP7). In addition to the swipe operation, the initiation of a pinch-in operation or a pinch-out operation may be determined. That is, the processor 132 can determine whether an operation in which the position of the finger 31 that is to be detected relative to the control surface 11 changes at a speed less than the threshold value is initiated.

When it is determined that the swipe operation is initiated (YES in STEP7), the processor 132 enables the first switch area 111, the second switch area 112, and the third switch area 113 to accept the pad operation in addition to the intermediate area 115 (STEP8). That is, the pad operation can be accepted substantially over the entire control surface 11.

Figure 10:
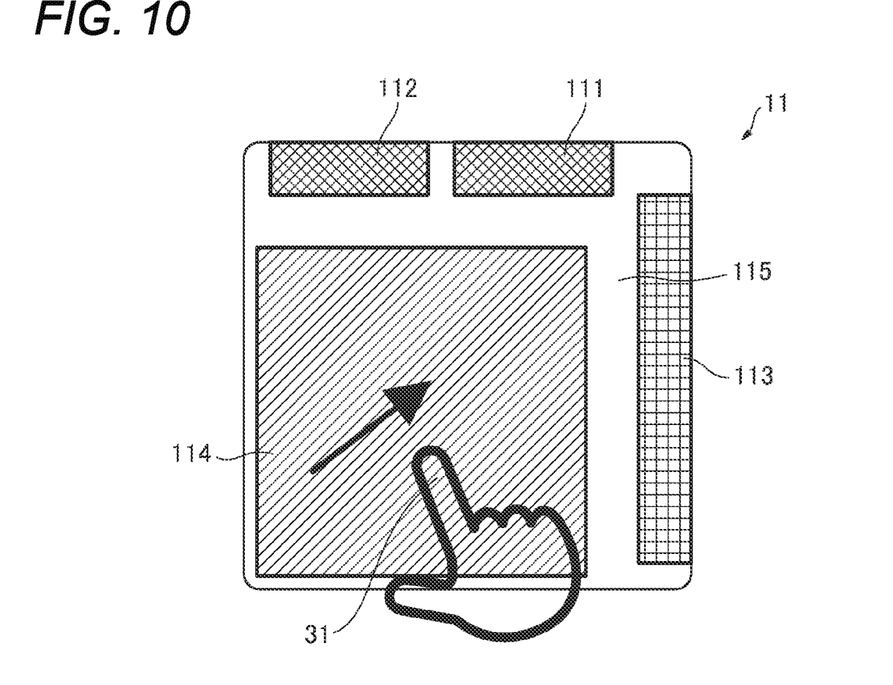
FIG. 10 illustrates a fourth exemplary operation executed by the processing device of FIG. 1.
Figure 11:
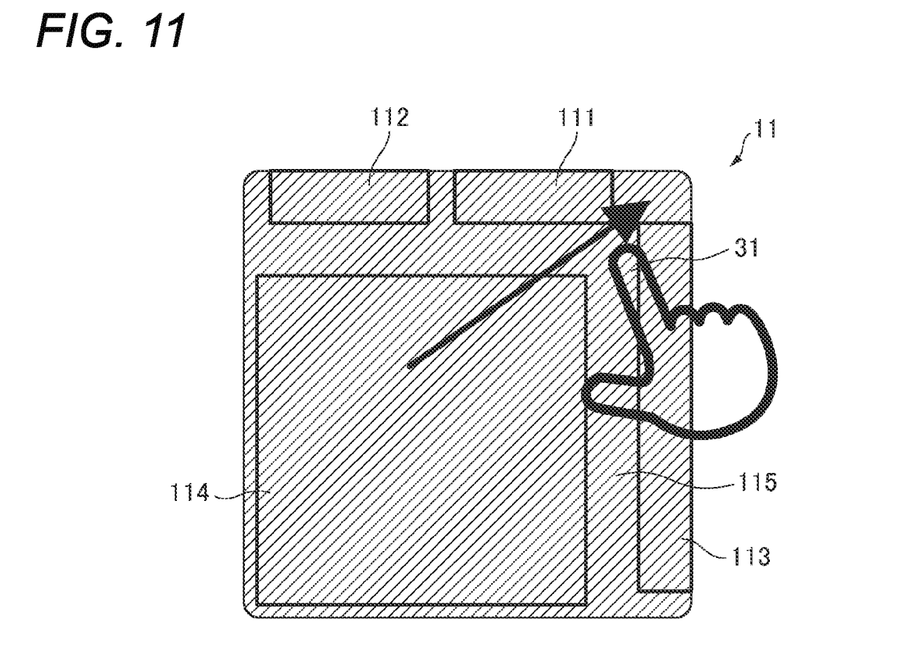
FIG. 11 illustrates the fourth exemplary operation executed by the processing device of FIG. 1.

FIG. 10 illustrates a state in which the swipe operation with the finger 31 is initiated in the pad area 114. In this case, as illustrated in FIG. 11, the first switch area 111, the second switch area 112, the third switch area 113, and the intermediate area 115 are changed to areas capable of accepting the operation with respect to the pad area 114. Accordingly, even if the finger 31 is not located in the initial pad area 114, the function f4 of the controlled device associated with the pad area 114 can be enabled as long as the finger 31 is located in the control surface 11.

When it is determined that the swipe operation is not initiated (NO in STEP7 in FIG. 3), the processor 132 enables the intermediate area 115 to accept the pad operation (STEP6), as described with reference to FIG. 9.

When an operation in which the position of the finger 31 that is to be detected relative to the control surface 11 changes at a speed less than the threshold value, such as a swipe operation, a pinch-in operation, or a pinch-out operation is performed, the moving range of the finger 31 tends to be relatively wide. According to the configuration as described above, the stringency relating to the position where the operation is accepted can be alleviated even for such an operation. Accordingly, it is possible to further improve the operability of the remote control device 10 equipped with the control surface 11. In addition, the control surface 11 having a limited size can be utilized to the maximum extent to accept the pad operation.

As illustrated in FIG. 3, when it is determined that the finger 31 contacts or approaches any of the first switch area 111, the second switch area 112, and the third switch area 113 based on the detection signal DS (YES in STEP3), the processor 132 may determine whether one or more fingers of the occupant contact or approach a plurality of positions in the control surface 11 (STEP9).

When it is determined that one or more fingers of the occupant contact or approach a plurality of positions in the control surface 11 (YES in STEP9), the processor 132 returns the processing to STEP1 without enabling the intermediate area 115 to accept the switch operation. That is, the processor 132 maintains the initial state of the intermediate area 115, and suspends the acceptance of the switch operation.

Figure 12:
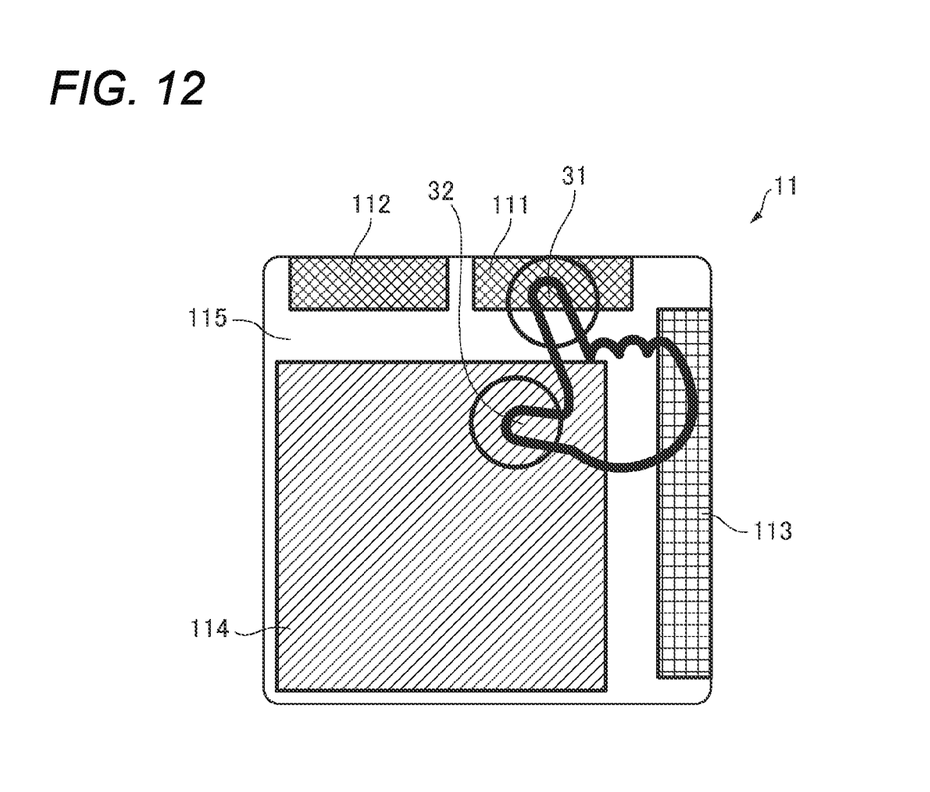
FIG. 12 illustrates a fifth exemplary operation executed by the processing device of FIG. 1.

FIG. 12 illustrates a state in which the finger 31 of the occupant contacts the first switch area 111 and another finger 32 contacts another position in the control surface 11. In this case, the initial state of the intermediate area 115 is maintained, and the acceptance of the operation performed with respect to the first switch area 111 is suspended.

When it is determined that one or more fingers of the occupant do not contact or approach a plurality of positions in the control surface 11 (NO in STEP9 in FIG. 3), the processor 132 enables the intermediate area 115 to accept the switch operation (STEP4), as described with reference to FIGS. 5 and 7.

Except in a case where a pinch-in operation or a pinch-out operation is performed in the pad area 114, there is a high possibility that a situation in which contact or approach of one or more occupant's fingers is detected at a plurality of positions in the control surface 11 is caused by an unintended operation or an erroneous operation. According to the configuration as described above, not only it is possible to suppress the occurrence of a situation in which the control of the controlled device is performed based on an unintended operation, but also it is possible to prompt the occupant to accurately perform an intended operation.

The processor 132 having each function described above can be realized by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. ROM is an example of the non-transitory computer-readable medium. The processor designates at least a part of the program stored in the ROM, loads the program on the RAM, and executes the processing described above in cooperation with the RAM. The above-mentioned computer program may be pre-installed in a general-purpose memory, or may be downloaded from an external server via a communication network and then installed in the general-purpose memory. In this case, the external server is an example of the non-transitory computer-readable medium.

The processor 132 may be implemented by a dedicated integrated circuit capable of executing the above-described computer program, such as a microcontroller, an ASIC, and an FPGA. In this case, the above-mentioned computer program is pre-installed in the storage element included in the dedicated integrated circuit. The memory element is an example of the non-transitory computer-readable medium. The processor 132 may also be implemented by a combination of a general-purpose microprocessor and a dedicated integrated circuit.

The above embodiment is merely illustrative for facilitating understanding of the presently disclosed subject matter. The configuration according to the above embodiment can be appropriately modified or improved without departing from the gist of the presently disclosed subject matter.

As long as the plurality of areas are associated with the functions of one or more controlled devices, the layout of the plurality of areas on the control surface 11 and the type of operation to be accepted can be appropriately changed. However, the intermediate area 115 must be located between the plurality of areas.

In the above embodiment, the electrostatic capacitance between the control surface 11 and the finger 31 of the occupant is detected. As long as a change in the electrostatic capacitance caused by the operation performed with respect to the control surface 11 can be detected, the operation may be performed with another body part, or with an article of clothing or a tool interposed between the body part and the control surface 11. That is, the article of clothing or tool may also be an example of the object.

The remote control device 10 may be installed in a mobile entity other than the vehicle 20. Examples of the mobile entity include railways, aircraft, and ships. The mobile entity may not require a driver.

The present application is based on Japanese Patent Application No. 2020-007462 filed on Jan. 21, 2020, the entire contents of which are incorporated herein by reference.

What is claimed is:

1. A remote control device adapted to be installed in a mobile entity to control an operation of a controlled device, comprising:
   a control surface having a first area configured to accept a first operation performed with an object for enabling a first function of the controlled device, a second area configured to accept a second operation performed with the object for enabling a second function of the controlled device, and a third area located between the first area and the second area;
   a detector configured to detect an electrostatic capacity between the control surface and the object; and
   a processing device configured to:
      determine that the object contacts or approaches the first area, the second area or the third area, based on the electrostatic capacity;
      enable the third area to accept the first operation in a case where it is determined that the object contacts or approaches the first area;
      enable the third area to accept the second operation in a case where it is determined that the object contacts or approaches the second area; and
      disable acceptance of the first operation and the second operation in a case where it is determined that the objects contacts or approaches the third area prior to the first area and the second area.

2. The remote control device according to claim 1,
   wherein the second operation is an operation in which a position of the object that is to be detected relative to the control surface changes with a speed that is less than a threshold value; and
   wherein the processing device is configured to enable the first area to accept the second operation when the second area begins to accept the second operation.

3. The remote control device according to claim 1,
   wherein the controlled device is equipped with a display section configured to display an image;
   wherein the second operation is an operation for associating a position in the control surface with a position in the image; and
   wherein the processing device is configured to enable the first area to accept the second operation when the second area begins to accept the second operation.

4. The remote control device according to claim 1,
   wherein the processing device is configured to maintain an initial state of each of the first area and the second area in a case where it is determined that the object contacts or approaches plural positions on the control surface.

5. A processing device adapted to be installed in a remote control device configured to remotely control an operation of a controlled device in a mobile entity, comprising:
   a reception interface configured to receive a detection signal corresponding to an electrostatic capacity between an object and a control surface having a first area configured to accept a first operation performed with the object for enabling a first function of the controlled device, a second area configured to accept a second operation performed with the object for enabling a second function of the controlled device, and a third area located between the first area and the second area; and a processor configured to:
    determine that the object contacts or approaches the first area, the second area or the third area, based on the electrostatic capacity;
    enable the third area to accept the first operation in a case where it is determined that the object contacts or approaches the first area;
    enable the third area to accept the second operation in a case where it is determined that the object contacts or approaches the second area; and
    disable acceptance of the first operation and the second operation in a case where it is determined that the objects contacts or approaches the third area prior to the first area and the second area.

6. A non-transitory computer-readable medium having recorded a computer program adapted to be executed by a processor in a processing device adapted to be installed in a remote control device configured to remotely control an operation of a controlled device in a mobile entity, the computer program being configured to, when executed, cause the processing device to:
    receive a detection signal corresponding to an electrostatic capacity between an object and a control surface having a first area configured to accept a first operation performed with the object for enabling a first function of the controlled device, a second area configured to accept a second operation performed with the object for enabling a second function of the controlled device, and a third area located between the first area and the second area;
    determine that the object contacts or approaches the first area, the second area or the third area, based on the electrostatic capacity;
    enable the third area to accept the first operation in a case where it is determined that the object contacts or approaches the first area;
    enable the third area to accept the second operation in a case where it is determined that the object contacts or approaches the second area; and
    disable acceptance of the first operation and the second operation in a case where it is determined that the objects contacts or approaches the third area prior to the first area and the second area.

\* \* \* \* \*